United States Patent [19]

Nepela

[11] Patent Number: 5,734,533
[45] Date of Patent: Mar. 31, 1998

[54] DUAL GAP MAGNETIC HEAD AND METHOD OF MAKING THE SAME

[75] Inventor: Daniel A. Nepela, San Jose, Calif.

[73] Assignee: Read-Rite Corporation, Milpitas, Calif.

[21] Appl. No.: 648,329

[22] Filed: May 15, 1996

[51] Int. Cl.$^6$ .............................. G11B 5/23; G11B 5/147
[52] U.S. Cl. .............................. 360/119; 360/126
[58] Field of Search ........................ 360/119, 126, 360/113, 122, 121, 123

[56] References Cited

U.S. PATENT DOCUMENTS

| | | | |
|---|---|---|---|
| 4,405,959 | 9/1983 | Chabrolle | 360/119 |
| 4,742,412 | 5/1988 | Kuriyama | 360/121 |
| 4,908,724 | 3/1990 | Jeffers | 360/121 |
| 5,212,611 | 5/1993 | Dee | 360/113 |
| 5,267,112 | 11/1993 | Batra et al. | 360/119 |
| 5,428,491 | 6/1995 | Smith | 360/113 |
| 5,483,403 | 1/1996 | Voegeli | 360/126 |

FOREIGN PATENT DOCUMENTS 61-240413  10/1986  Japan.

*Primary Examiner*—Allen Cao
*Attorney, Agent, or Firm*—Nathan N. Kallman

[57] ABSTRACT

An air bearing magnetic head is formed with a dual gap for minimizing side fringe fields, side reading, side writing, cross-talk interference, and pulse asymmetry, while maintaining the efficiency of the head. The method of manufacturing the head enables the control of the effective track width with great precision. The head is made by depositing a layer of magnetic material that defines a first pole P1. A dual gap is formed on the first pole P1 by depositing a first layer of nonmagnetic material that defines two side gaps and part of a central gap interposed between the two side gaps. A second layer of nonmagnetic material is deposited on the first layer in order to further define the central gap. In its final configuration, the central gap is substantially wider than the two side gaps. Another layer of magnetic material is deposited over the central and side gaps for defining a second pole P2. The outer edges of the dual gap and the two poles P1, P2 are trimmed such that sections of the side gaps are gradually recessed relative to the air bearing surface of the magnetic head.

5 Claims, 2 Drawing Sheets

DUAL GAP MAGNETIC HEAD AND METHOD OF MAKING THE SAME

FIELD OF THE INVENTION

This invention relates to magnetic heads and in particular to a magnetic head having a dual gap configuration that minimizes side reading, side writing, and pulse asymmetry.

DESCRIPTION OF THE PRIOR ART

In present day storage apparatus, such as disk drives, data is recorded in densely packed tracks on a magnetic medium, such as a disk, by means of an inductive recording head, and reads the recorded data by means of a magnetoresistive (MR) head. The magnetic head or transducer is disposed on an air bearing slider that flies above the surface of the magnetic record medium while being supported by a suspension assembly and positioned over the data tracks by an actuator. Magnetic recording is effectuated by applying current to conductive coils disposed within insulation between two write poles of the recording head. Magnetic flux flows along the magnetic path defined by the write poles. Variations in flux occurring at the insulating write gap formed between ends of the two poles result in recording of data on the magnetic medium corresponding to the transitions or flux variations. Reading of the recorded data is accomplished by an MR head that senses the transitions or flux variations of the recorded data.

The width and spacing of the data tracks determine the density of data that can be recorded on the magnetic medium. Problems with reading and recording data on the magnetic medium can occur due to side fringe fields emanating from both sides of the write gap. Such side fringe fields increase undesirable side writing, side reading, and pulse asymmetry in the head.

Several solutions have been proposed to minimize the effects of the side fringe fields. For instance, one such solution is described in U.S. Pat. No. 5,315,469 to McNeil, and consists of configuring the write gap so that it is formed of a central portion positioned between nonparallel side portions having divergent angles with respect to the central portion. In the recording process, the central portion writes transitions on the recording medium in a desired orientation, while the side portions write transitions that are angled relative to the data transitions written by the central portion. The angled transitions produce erase bands between adjacent tracks of information. A generally similar configuration is described in U.S. Pat. No. 4,947,541 to Toyoda et al.

However, since the central and angled portions of the write gaps described in these patents have a uniform thickness, and are positioned at a generally uniform height relative to the magnetic medium, the problems of side reading, side writing, and pulse asymmetry are not satisfactorily solved.

SUMMARY OF THE INVENTION

An object of this invention is to provide a magnetic head and method of making the same, wherein the magnetic head includes a dual gap configuration for minimizing side fringe fields and the resulting undesirable side reading, side writing, and pulse asymmetry, while maintaining the efficiency of the head.

Another object of this invention is to provide a magnetic head with a gap that minimizes cross-talk between adjacent tracks.

Still another object of this invention is to develop a method for controlling the track width with great precision.

According to this invention, a magnetic head is made by depositing a layer of magnetic material that defines a first pole P1 and forming a dual gap on the first pole P1 by depositing a first layer of nonmagnetic material that defines two side gaps and part of a central gap interposed between the two side gaps. A second layer of nonmagnetic material is deposited on the first layer in order to further define the central gap. In its final configuration, the central gap is substantially wider than the two side gaps. Another layer of magnetic material is deposited on the central and side gaps for defining a second pole P2. The outer edges of the dual gap and the two poles P1, P2 are trimmed such that sections of the side gaps are gradually recessed relative to the air bearing surface of the magnetic head.

BRIEF DESCRIPTION OF THE DRAWING

The invention will be described in greater detail with reference to the drawing in which.

Similar numerals refer to similar elements in the drawing. It should be understood that the sizes of the different components in the figures are not necessarily to scale or in exact proportions, and are shown for visual clarity and for the purpose of explanation.

DETAILED DESCRIPTION OF THE INVENTION

Figure 1:
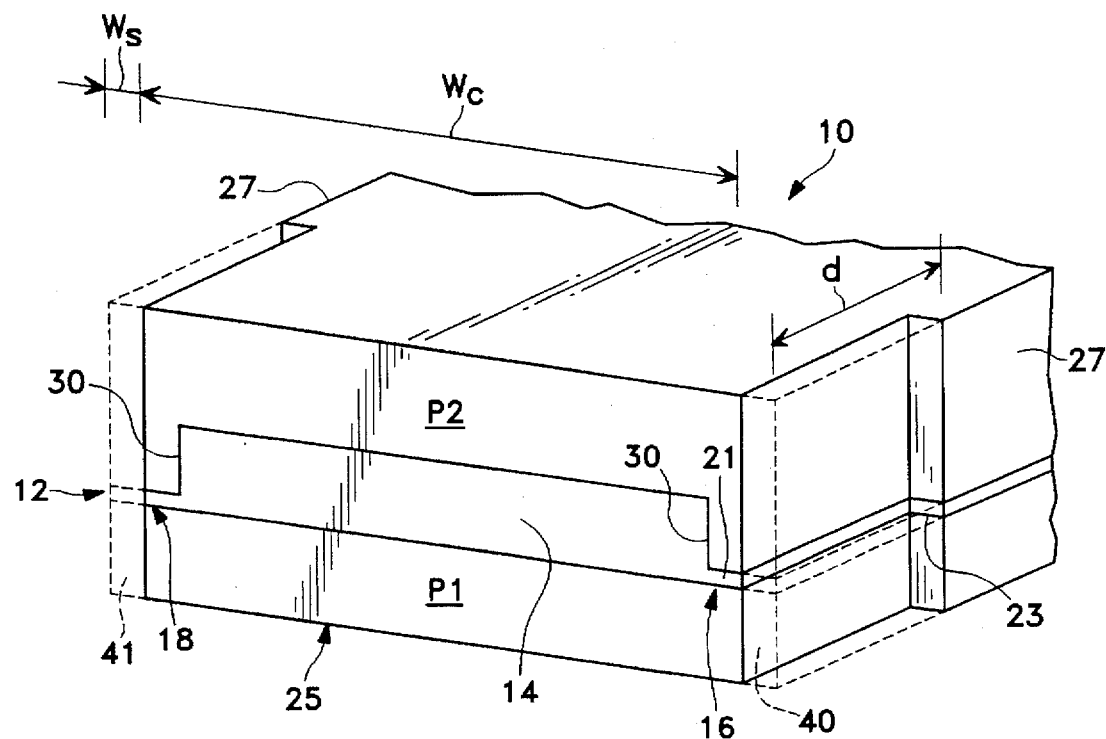
FIG. 1 is an isometric view of part of a head having a dual gap configuration, including a wide central gap and two narrow gradually recessed side gaps, according to the present invention.
Figure 2:
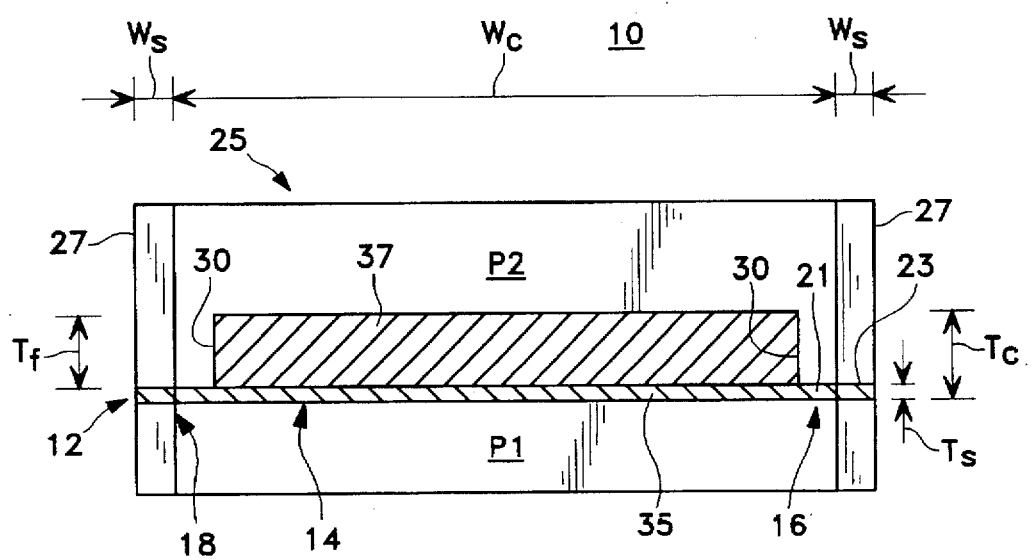
FIG. 2 is a front view of the air bearing surface of the head of FIG. 1 illustrating the layered configuration of the central gap.

FIGS. 1 and 2 illustrate part of a head 10 that is formed of a first pole P1, a second pole P2, and a dual gap 12 interposed between the first pole P1 and the second pole P2. The dual gap 12 includes a wide central gap 14 and two gradually recessed side gaps 16, 18. The side gaps 16, 18 are substantially similar and symmetrically disposed relative to the central gap 14, and therefore only one side gap 16 will be described in detail. As used herein, the term "gap" means a spacing that is filled with an appropriate material, such as a nonmagnetic or other suitable material, for instance alumina ($Al_2O_3$).

In a preferred embodiment, the side gap 16 is formed of a first section 21 and a second recessed section 23. The first section 21 is flush with the air bearing surface 25 of the head 10 and the outer surface of the central gap 14, and is positioned adjacent to the central gap 14. The second section 23 is recessed relative to the first section 21 and the central gap 14, and is positioned at the outer edge 27 of the head 10, adjacent to the first section 21. The side gap 16 is substantially narrower and shorter than the central gap 14.

As a result of this dual gap configuration, the magnetic field between the two poles P1 and P2 is progressively reduced from the outer edge 30 of the central gap 14 toward the outer edge 27 of the head 10. Consequently, the dual gap configuration minimizes the side fringe fields between the two poles P1 and P2, on both sides of the central gap 14. In addition, crosstalk between adjacent tracks is minimized by virtue of the side gaps 16, 18. The outer edge 30 of the central gap 14 is separated from the adjacent side track by at least the width Ws of the side gap 16 or 18. Such separation minimizes interference or cross-talk between adjacent tracks. Moreover, the second section 23 of each side gap 16, 18 is no longer sensitive to effectively read significant data from the written track, or to write data onto the track, since it is positioned remotely from the magnetic medium (not shown).

Furthermore, the dual gap configuration maintains the read/write efficiency of the head 10 by controlling the width Wc of the central gap 14, and thus the operational track width of the head 10, with a high degree of precision. The widths of the side gaps 16 and 18 may be defined very accurately and symmetrically relative to the central gap 14 so as to minimize pulse asymmetry.

In the head fabrication process the first pole P1 is formed, and a first layer 35 of nonmagnetic material is deposited on the surface of the first pole P1 for defining the side gaps 16, 18. The first layer 35 is uniform and does not require additional patterning. The thickness Ts of the side gaps 16, 18 corresponds to the thickness of the first layer 35 which can be defined with great precision.

A second layer 37 of nonmagnetic material is then deposited on top of the first layer 35, such that the outer edges of the first and second layers 35 and 37 are not coplanar. An important aspect of the present invention is that the poles P1 and P2 do not need to be aligned at this stage of the fabrication process, and thus a great degree of manufacturing tolerance can be accommodated.

The thickness Tc of the central gap 14 corresponds to the thickness Tf of the second layer 37 and the thickness Ts of the first layer 35, as expressed by the following equation:

$$Tc = Tf + Ts.$$

Since the thicknesses Tf and Ts can be defined with great precision using well known deposition techniques, it follows that the effective thickness Tc of the central gap 14 can also be defined with great precision.

The second pole P2 is then formed by depositing a seed layer of magnetic material, such as Permalloy (a nickel-iron alloy), on top of the first and second layers 35, 37. The second pole P2 is then plated by means of well known techniques.

The second sections 23 of the side gaps 16 and 18 are then formed, for instance by milling, etching or trimming the outer edges 27 of the head 10 to a desired depth "d". A desirable way to trim the side gaps 16, 18 is to use the focused ion beam technique which can be performed with a high degree of accuracy. The sections 40, 41 of the outer edges that have been trimmed are shown in dashed lines in FIG. 1. It is during this trimming process that the first and second poles P1 and P2 are aligned precisely.

In an exemplary embodiment of the head 10, the depth "d" of the second sections 23 is on the order of 0.5 micron to 2 microns. The width Ws of each side gap 16, 18 is about ⅛ micron, which corresponds approximately to 2% to 15% of the width Wc of the central gap 14.

Figure 3:
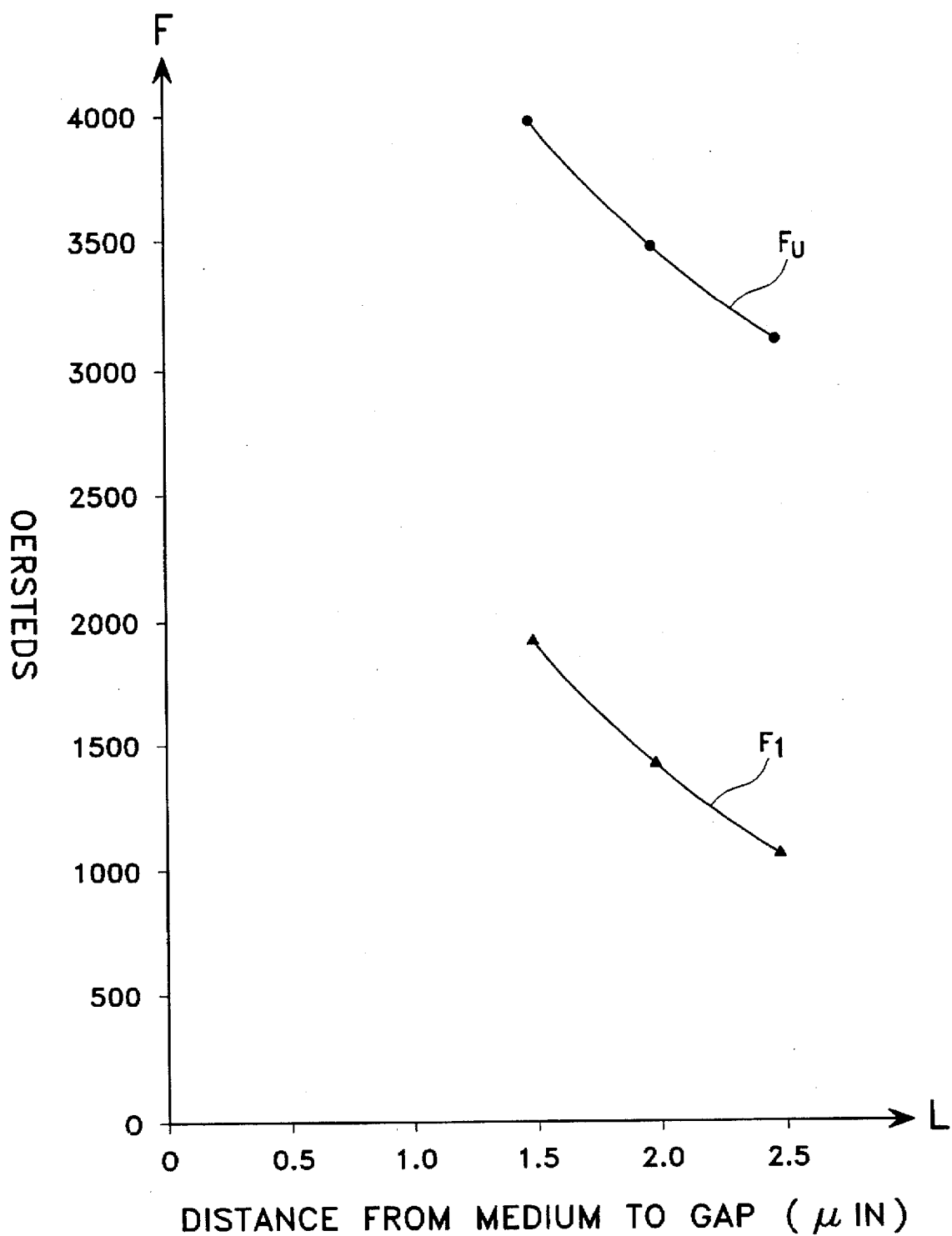
FIG. 3 is a graphical illustration for comparing two magnetic fields, one across the central gap, and the other across the side gaps.

FIG. 3 illustrates two graphs plotting the magnetic fields "F" measured in Oersteds at mid-plane of the magnetic medium, relative to a distance "L" from the central gap 14 to the mid-plane of the magnetic medium. The distance "L" is measured in micro-inches. The upper graph "Fu" corresponds to the magnetic field delivered across the central gap 14 with a thickness of about 0.2 micron, and the lower graph "Fl" corresponds to the magnetic field delivered across the first section 21 of one of the side gaps 16, 18 with a thickness of approximately 0.05 micron.

In the present illustration the coercivity "Hc" of the magnetic medium is about 2000 Oersteds. The lower graph "Fl" shows that the magnetic field delivered across the side gaps 16, 18 is less than the coercivity, and thus it is not sufficient to write transitions on the magnetic medium. The upper graph "Fu" shows that the magnetic field delivered across the central gap 14 is much greater than the coercivity, and thus it is amply sufficient to write transitions on the magnetic medium.

While the present invention has been described in connection with an inductive head 10, it should be understood that the concept is similarly applicable to an inductive head with an MR sensor. In addition, the present invention may be used to minimize the size of the band guards between adjacent tracks, since the side gaps 16, 18 provide an effective magnetic separation between adjacent tracks. Furthermore, while the side gaps 16, 18 were described as having a single stepped configuration, it should be understood that multiple steps or an arcuate configuration may alternatively be used.

What is claimed is:

1. A magnetic head having an air bearing surface comprising:

a deposited first pole;

a second pole deposited above said first pole; and a dual gap interposed between said first and second poles and formed of a central gap and two gradually recessed side gaps that are substantially similar and symmetrically disposed relative to said central gap;

said central gap being substantially wider than said two side gaps, wherein each of said side gaps comprises:

a first section positioned adjacent to said central gap, and substantially coplanar with said air bearing surface and the outer surface of the central gap; and a second section adjacent to said first section, and recessed relative to the first section and the outer surface of the central gap and is positioned at the outer edge of the head, so that side fringe magnetic fields between said first and second poles are minimized.

2. A magnetic head according to claim 1, wherein said each of said side gaps is substantially narrower and shorter than said central gap.

3. A magnetic head according to claim 2, wherein said central gap has a width Wc;

wherein said each of said side gaps has a width Ws; and wherein said width Ws ranges between about 2% Wc and 15% Wc.

4. A magnetic head according to claim 3, wherein the thickness of said side gaps is selected such that the magnetic field delivered at a mid-plane of an adjacent magnetic medium is less than the coercivity of said magnetic medium.

5. A magnetic head according to claim 4, wherein the coercivity of said magnetic medium is about 2000 Oersteds.

* * * * *